United States Patent
Jampolsky et al.

(10) Patent No.: US 6,625,437 B1
(45) Date of Patent: Sep. 23, 2003

(54) LOCATION AND EVENTS REPORTING IN A WIRELESS TELECOMMUNICATIONS NETWORK

(75) Inventors: Laurie M. Jampolsky, Overland Park, KS (US); Douglas Bagarozy, Overland Park, KS (US); Von McConnell, Leawood, KS (US)

(73) Assignee: Sprint Spectrum, L.P., Overland Park, KS (US)

( * ) Notice: Subject to any disclaimer, the term of this patent is extended or adjusted under 35 U.S.C. 154(b) by 0 days.

(21) Appl. No.: 09/401,933

(22) Filed: Sep. 23, 1999

(51) Int. Cl.[7] .............................................. H04M 11/00
(52) U.S. Cl. .................. 455/405; 455/67.1; 455/560; 455/423; 379/221.09
(58) Field of Search .................. 455/422, 414, 455/424, 428, 436, 440, 456, 461, 457, 423, 426, 405, 408, 67.1, 560, 561; 379/221.09

(56) References Cited

U.S. PATENT DOCUMENTS

| | | | |
|---|---|---|---|
| 4,191,860 | A | 3/1980 | Weber |
| 5,247,571 | A | 9/1993 | Kay et al. |
| 5,303,285 | A | 4/1994 | Kerihuel et al. |
| 5,353,331 | A | 10/1994 | Emery et al. |
| 5,694,463 | A | 12/1997 | Christie et al. |
| 5,845,211 | A * | 12/1998 | Roach, Jr. .................. 455/428 |
| 6,044,259 | A * | 3/2000 | Hentila et al. ............. 455/406 |
| 6,052,598 | A * | 4/2000 | Rudrapatna et al. ........ 455/456 |
| 6,154,727 | A * | 11/2000 | Karp et al. .................... 705/3 |
| 6,185,198 | B1 * | 2/2001 | LaDue ........................ 370/329 |
| 6,212,391 | B1 * | 4/2001 | Saleh et al. ................. 342/450 |
| 6,236,365 | B1 * | 5/2001 | LeBlanc et al. ............. 342/450 |
| 6,311,060 | B1 * | 10/2001 | Evans et al. ............... 455/426 |
| 6,324,404 | B1 * | 11/2001 | Dennison et al. ........... 455/456 |
| 6,330,454 | B1 * | 12/2001 | Verdonk ..................... 455/456 |
| 6,393,288 | B1 * | 5/2002 | Sollee et al. ................ 455/445 |

* cited by examiner

*Primary Examiner*—Lee Nguyen
*Assistant Examiner*—Charles Craver
(74) *Attorney, Agent, or Firm*—Harley R. Ball; Steven J. Funk; Kevin D. Robb

(57) ABSTRACT

A wireless telecommunications network (10) that is operable to collect and report data relating to the status and use of a wireless phone (34) or other telecommunications device in near real-time in response to data collection requests made by subscribers or other authorized persons.

7 Claims, 2 Drawing Sheets

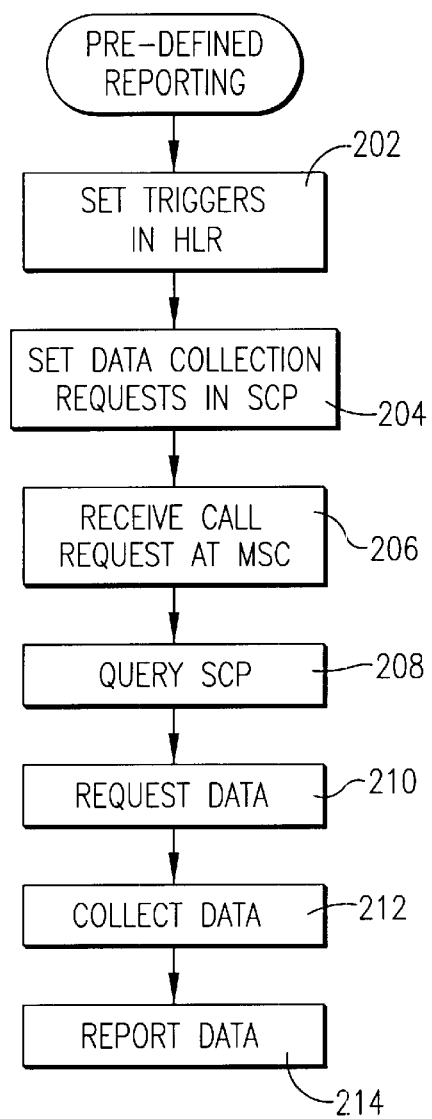
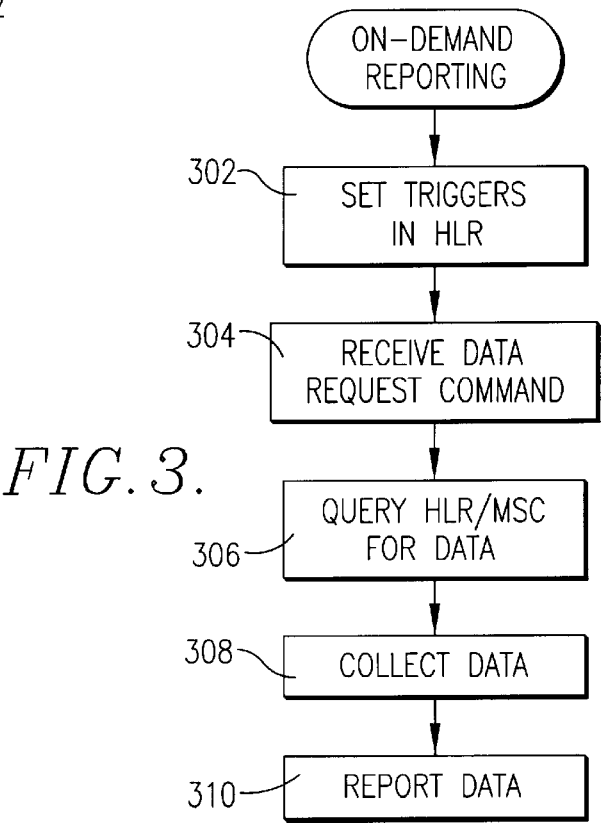
FIG.2.
FIG.3.

LOCATION AND EVENTS REPORTING IN A WIRELESS TELECOMMUNICATIONS NETWORK

BACKGROUND OF THE INVENTION

1. Field of the Invention

The present invention relates to wireless telecommunications networks, and more particularly, to a wireless telecommunications network operable to collect and report data relating to the status or use of a telecommunications device in near real-time.

2. Description of the Prior Art

Many subscribers of wireless telecommunications network services desire to obtain information regarding the use of their wireless phones for billing and other purposes. Similarly, many persons or organizations that allow others to use their phones or that pay for wireless phone services for others, such as parents who allow their children to use their phones and companies that provide work phones to their employees, desire to obtain information regarding when, where, and for what purpose the phones are being used.

Unfortunately, however, existing wireless networks only provide such information periodically in historical reports, typically in billing reports at the end of each month. Moreover, the information that is provided typically only includes the originating and/or destination phone numbers and the length of calls but does not include other desirable information such as location tracking for the phone and other status information.

OBJECTS AND SUMMARY OF THE INVENTION

The present invention solves the above-described problems and provides a distinct advance in the art of wireless telecommunications networks. More particularly, the present invention provides a wireless telecommunications network that is operable to collect and report data relating to the status and use of a wireless phone or other telecommunications device in near real-time in response to data collection requests made by subscribers or other authorized persons.

The wireless telecommunications network of the present invention broadly includes: a base transceiver station operable for transmitting wireless communications to and receiving wireless communications from at least one telecommunications device served by the network; a mobile switching center coupled with the base transceiver station and operable for switching and coordinating communications between the base transceiver station and other network components and for launching call routing queries; and a service control point coupled with the mobile switching center and operable for receiving the call routing queries and for providing routing instructions to the mobile switching center in response to the call routing queries.

In accordance with one aspect of the present invention, the service control point is operable for receiving a data collection request for data relating to the use or status of a telecommunications device, for collecting data from other components of the network in accordance with the data collection request, and for allowing access to the data collected in substantially real-time. In preferred forms, the network also includes a web interface coupled with the service control point and accessible via the internet. The web interface is operable for receiving data collection requests from authorized persons via the internet and for forwarding the data collection request to the service control point. The network may also be provided with a data collection device and a data reporting device coupled with the SCP and accessible via the internet for collecting the requested data and organizing the data in predefined reports.

The data collection and reporting functions of the present invention can be implemented to provide numerous new network reporting services. For example, the network can collect and report information relating to the current location of a particular phone in the network on a call-by-call basis. A subscriber or other authorized person can use this service to periodically receive location tracking information for a phone or to issue a data request to the network via the internet or other medium to determine the current location of their phone on a near real-time basis. Moreover, such information can be collected and reported by the network even if calls are not made by the phone.

The network can also collect and report information relating to the status or use of a phone such as when a phone moves into or out of a particular service area, how long the phone is in a particular service area, the originating phone number of calls received by the phone, the destination phone numbers of calls made by the phone, etc. A subscriber or other authorized person can use this service to determine, for example, when a phone first registers with a provider in a certain area so that they know that the phone and the person operating it has safely arrived in the area. Similarly, a subscriber can be immediately notified when a phone is used to dial a particular number such as 911 so that they can take appropriate action.

Additionally, the network of the present invention can be used to track the location of devices attached to certain assets such as vehicles, railroad cars, packages, etc. without calls being made from the devices. The network can even be used to collect and report various user inputted responses to announcements sent to a phone such as in tele-voting or market sampling without asking the location of the phone because the network can immediately determine the location of the phone.

BRIEF DESCRIPTION OF THE DRAWING FIGURES

A preferred embodiment of the present invention is described in detail below with reference to the attached drawing figures, wherein:

FIG. 2 is a flow diagram broadly illustrating the steps performed to collect and report data relating to the status or use of a telecommunications device in the wireless telecommunications network in accordance with pre-defined data collection requests.

FIG. 3 is a flow diagram broadly illustrating the steps performed to collect and report data relating to the status or use of a telecommunications device in the wireless telecommunications network in accordance with on-demand data collection requests.

DETAILED DESCRIPTION OF THE PREFERRED EMBODIMENTS

System Architecture

Figure 1:
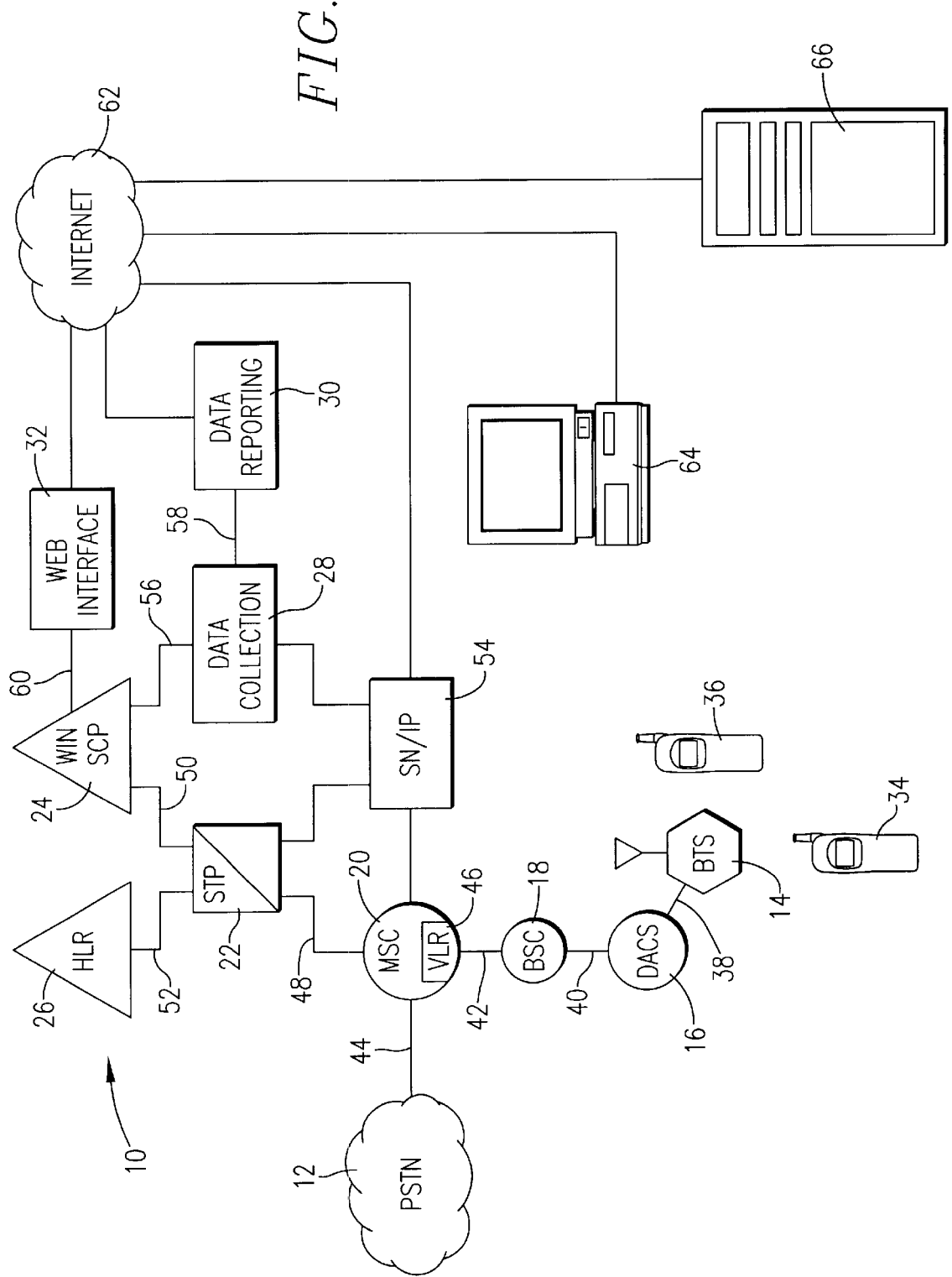
FIG. 1 is a schematic diagram of a wireless telecommunications network constructed and configured in accordance with a preferred embodiment of the present invention.

Turning now to the drawing figures, and particularly FIG. 1, a wireless telecommunications network 10 constructed in accordance with a preferred embodiment of the invention is illustrated. The wireless telecommunications network is coupled with a conventional public switched telephone network (PSTN) 12 and is preferably a code division multiple access (CDMA) PCS wireless intelligent network such as the PCS network owned and operated by Sprint PCS. The PSTN 12 merely refers to the entire local, long distance, and international landline phone system used in the United States.

The wireless telecommunications network 10 broadly includes a base transceiver station (BTS) 14, a digital access and cross-connect system (DACS) 16, a base station controller (BSC) 18, a mobile switching center (MSC) 20, a signal transfer point (STP) 22, a service control point (SCP) 24, and a home location register (HLR) 26. In accordance with one aspect of the present invention, the network also includes a data collection device 28, a data reporting device 30, and a web interface 32, which cooperate with the SCP and other components of the network for providing certain data collection and reporting functions described below.

In more detail, the BTS 14 provides wireless communications to and from mobile telecommunications devices in a telecommunications cell such as the illustrated PCS or AMPS phones 34, 36. The BTS includes a plurality of transceivers coupled with one or more antennas that together provide wireless communications within the cell. The cell is preferably subdivided into three sectors and is part of a CDMA PCS telecommunications network such as the Sprint PCS network described above. The BTS is operable to control transmission and reception of CDMA PCS traffic independently in the three sectors using selected ones of a defined set of codes for each sector. The codes may include, for example, Walsh codes. An example of a BTS that may be used with the present invention is the Nortel CDMA Outdoor 1900 MHZ base station. Those skilled in the art will appreciate that the wireless network may include numerous BTSs positioned in telecommunications cells throughout the country.

The DACS 16 is a digital switching device that is coupled with the BTS 14 with signaling data links and trunk circuits 38. The DACS is operable for routing and switching control messages between the BTS and the other components in the wireless network. Additional DACS may be positioned at other concentration points in the network and is well known in the art.

The BSC 18 is coupled with the DACS 16 with signaling data links and trunk circuits 40 and is operable to control operation of the DACS and the BTS 14. The BSC is a high-capacity switch that provides total overview and control of wireless functions supported by the network 10 such as call handover control, cell configuration management, and BTS and mobile phone power level management. The BSC multiplexes signals from multiple BTSs into transmission signals that are sent to the MSC 20. The BSC also routes network signals and calls from other components of the wireless network to the appropriate BTS for transmission to the mobile stations.

The MSC 20 is coupled with the BSC 18 and other base station controllers with signaling data links and trunk circuits 42 and is operable to coordinate the establishment of calls to and from the mobile stations and to handle transmission facilities management, mobility management, and call processing. The MSC is also connected with the PSTN 12 by signaling data links and trunk circuits 44 to provide switching between the wireless network and the PSTN.

The MSC 20 either includes an integrated visitor location register (VLR) 46 or is coupled with a stand-alone VLR. The VLR includes a database that contains information relating to mobile phones that are resident in their home service area, roaming outside of their home service area, or roaming in another wireless network. When a mobile phone is active in any service area, it automatically registers with the base station or mobility controller in that area. The local provider in the service area then queries the HLR 26 through the STP 22 using Signaling System #7 (SS7) or other signaling to retrieve information needed to verify the legitimacy of the mobile phone and to obtain a profile of the features associated with the mobile phone. The HLR responds to the query by transferring the necessary data to the VLR. This information is maintained in the VLR of the MSC as long as the mobile phone remains active within that coverage area. The HLR also updates its own database to indicate the current location of the mobile phone so that it can forward calls to the phone through the local provider in the service area. The querying process in the preferred wireless network is accomplished via SS7 links using the STP and SCP 24 as described below.

The STP 22 is connected between the MSC 20 and the SCP 24 by signaling data links 48, 50 and is operable to route signaling messages therebetween. STPs are well known in the art with an example being the DSC Megahub.

The SCP 24 is coupled with the STP 22 to exchange signaling messages with the MSC 20 and other mobile switching centers. The SCP includes, or is operable. to access, a plurality of databases for providing intelligence and routing information to the wireless network 10 and PSTN 12.

In accordance with one aspect of the present invention, the SCP 24 is programmed or otherwise configured to receive data collection requests relating to the status or use of one of the mobile devices 34 or 36 or any other device served by the network, for collecting data from other components in the network in accordance with the request, and for allowing access to the collected data in substantially real-time as described in more detail below. Some or all of the data collection and reporting functions of the SCP may also be implemented in a service node or intelligent peripheral device 54.

The HLR 26 may be a database residing on the SCP 24 or may be a stand-alone database or service control point coupled with the STP 22 by signaling data links 52 for servicing several SCPs. In either case, the HLR includes a database containing subscriber data and information used to identify a subscriber of the wireless network and subscriber data relating to features and services available to the subscriber. The HLR, which represents the "home" database for subscribers, may, for example, contain a record for each home subscriber that includes location information, subscriber status, subscribed features, and directory numbers. The HLR is used in conjunction with the VLR as described above to support mobility management features to which the user has subscribed when that user is in or roaming outside of his home area.

Some or all of the location information stored in the HLR 26 may also be stored in a mobile position center (MPC) or position device equipment (PDE) resident in or coupled with the SPC 24. The MPC or PDE may include, for example, cell sector information and other location information such as GPS readings for a mobile device.

As is well known in the art, the MSC 20, STP 22, SCP 24, HLR 26, and VLR 46 all communicate via out of band signaling, typically using IS-41, SS7 or TCP/IP protocols to facilitate the routing of calls through the wireless network 10. The signaling allows the network elements to exchange information to more quickly and efficiently route calls over the network.

The data collection device 28 is coupled with the SCP 24 by data links 56 and is configured for communicating with the SCP using IS-41, SS7, or TCP/IP protocols. The data collection device is operable for storing and collecting data initially collected by the SCP. The data collection device is preferably a computer-based device coupled with an internal or external database. Alternately, the data collection device may be an integral component of the SCP or other network component.

The data reporting device 30 is coupled with the data collection device 28 by data links 58 and is configured for communicating with the data collection device using IS-41, SS7, or TCP/IP protocols. The data reporting device is operable for arranging the data collected by the SCP 24 and the data collection device into reports that can then be accessed by a subscriber of the network or other person as described in more detail below. The data reporting device is preferably a computer-based device coupled with an internal or external database. Alternately, the data reporting device may be an integral component of the data collection device 28, SCP, or other network component.

The web interface 32 is coupled with the SCP 24 by data links 60 and is configured for communicating with the SCP using IS-41, SS7, or TCP/IP protocols. The web interface may be coupled directly with the SCP or indirectly via or more internet gateways or firewalls. The web interface serves as an interface between the SCP and the internet so that components external to the network 10 can communicate with the SCP via the internet as described below.

To provide the data collection and reporting functions of the present invention, the SCP 24, data reporting device 30, web interface 32, and service node/intelligent peripheral 54 are all operable to receive requests and other information from subscribers of the network and other authorized persons via the internet 62. For example, a subscriber of the network may operate a personal computer 64 or an administrator or billing representative of the network may operate a call processing or billing computer 66 to issue data collection requests to the network 10 via the internet as described below.

Operation

The components of the wireless telecommunications network 10, including the SCP 24, the data collection device 28, the data reporting device 30, and the MSC 20, are programmed to perform the data collection and reporting functions of the present invention. The software that performs and/or controls the steps of the present invention is stored on computer-readable memory devices resident on or accessible by the components of the network.

Data may be collected and reported either in accordance with pre-defined data requests or on-demand requests. FIG. 2 broadly illustrates the steps performed by the network to collect and report data in accordance with pre-defined data requests. Triggers are first set in the HLR 26 for a particular telecommunications device as depicted in step 202. For example, an origination or destination trigger may be set in the HLR for phone 34 so that the MSC 20 currently serving the phone is instructed to invoke or query the SCP 24 each time a call is originated from or directed to the phone.

Data collection requests are then set in the SCP 24 as depicted in step 204. As is known in the art, the SCP receives much information relating to the parameters of a call. The data collection requests of the present invention instruct the SCP to collect certain subsets of this information relating to the status or use of a telecommunications device served by the network such as the phone 34. For example, the data collection requests may instruct the SCP to collect and report information relating to: the location of the telecommunications device; the number of calls made by the telecommunications device; the number of calls received by the telecommunications device; the duration of calls made by the telecommunications device; the duration of calls made to the telecommunications device; the terminating phone numbers for calls made by the telecommunications device; the originating phone numbers for calls received by the telecommunications device; how long the telecommunications device has been in a particular location; and when the telecommunications device last made or received a call.

The data collection requests may be set in the SCP 24 by a person authorized to do so such as a subscriber operating computer 64 or a network administrator operating computer 64. To assist in the setting of data collection triggers, the SCP may include an HTML data collection template that can be filled in to indicate the type of data or information to be gathered.

Once the query triggers have been set in the HLR 26 and the data collection requests have been set in the SCP 24, the wireless telecommunications network 10 may begin collecting and reporting data for a particular telecommunications device as soon as that device becomes active in the network. For example, if the phone 34 is the subject of a data collection request, the network begins data collection when the MSC 20 receives a communication such as a call request or registration attempt from the phone as depicted in step 206. The MSC recognizes that the phone is subject to an origination trigger, and in response, sends a TCAP query message to the SCP via the STP 22 as depicted in step 208.

The SCP 24 analyzes the query and recognizes that the phone 34 is subject to certain data collection requests in accordance with the information in the HTML template. The SCP receives the requested information along with additional call parameter information from the MSC 20 and/or HLR 26 either after the call has been completed or during call processing as depicted in step 210. The SCP then sorts the requested information from the collected information in accordance with the data collection requests. For example, if the data collection requests instruct the SCP to collect information relating to the location of the phone and the terminating number of calls made by the phone, the SCP collects the location information from the HLR and the destination phone numbers from the MSC.

After the SCP 24 has collected and sorted the data, it periodically or immediately outputs the data to the data collection device 28 as depicted in step 212, which in turn periodically or immediately outputs the data to the data reporting device 30 as depicted in step 214. The data reporting device organizes the data into defined reports in accordance with the information entered into the HTML template or instructions from the requester and makes this information available to authorized persons via the internet. For example, the subscriber operating the computer 64 or the administrator operating the computer 66 may access the data reporting device 30 via the internet 62 at any time to review the collected data. Alternately, the data reporting device may automatically send the collected information to the computer 64 or 66 via the internet.

FIG. 3 broadly illustrates the steps performed by the wireless telecommunications network 10 to collect and report data in response to requests for information that are not made through pre-set instructions to the SCP 24. For example, a subscriber operating computer 64 may access the SCP via the internet 62 and the web interface 32 to request certain information on a one-time basis. As with the embodiment illustrated in FIG. 2, triggers are first set in the HLR 26 for a particular telecommunications device as depicted in step 302. For example, an origination or destination trigger may be set in the HLR for phone 34 so that the MSC 20 currently serving the phone is instructed to invoke or query the SCP 24 each time a call is originated from or directed to the phone.

Once the triggers have been set, an authorized person may send a data request to the SCP as depicted in step 304. For example, a subscriber may access the SCP from computer 64 and request current location information for phone 34 as well as a list of all phone numbers that have been dialed by the phone during a selected time period.

In response to the data collection request, the SCP 24 sorts the requested data from other information collected from the HLR 26, the MSC 20, or other network components as depicted in step 306. For example, if the data request instructs the SCP to collect information relating to the location of the phone 34 and the terminating number of calls made by the phone, the SCP receives and sorts the location information from the HLR and the destination phone numbers for the phone from the MSC.

After the SCP 24 has collected the data, it periodically or immediately outputs the data to the data collection device 28 as depicted in step 308, which in turn periodically or immediately outputs the data to the data reporting device 30 as depicted in step 310. The data reporting device organizes the data into defined reports in accordance with the information entered into the HTML template or instructions from the requester and makes this information available to authorized persons via the internet. For example, the subscriber operating the computer 64 or the administrator operating the computer 66 may access the data reporting device 30 via the internet 62 at any time to review the collected data. Alternately, the data reporting device may automatically send the collected information to the computer 64 or 66 via the internet.

Although the invention has been described with reference to the preferred embodiment illustrated in the attached drawing figures, it is noted that equivalents may be employed and substitutions made herein without departing from the scope of the invention as recited in the claims. For example, although the data collection and reporting functions of the present invention are preferably performed by the SCP 24 in cooperation with other components of the network 10, some or all of these data collection and reporting functions may also be implemented in the service node/intelligent peripheral device 54 or other network device.

Having thus described the preferred embodiment of the invention, what is claimed as new and desired to be protected by letters patent includes the following:

What is claimed is:

1. A method of operating a wireless telecommunications network for collecting and reporting data relating to the use of a wireless telecommunications device served by the network, the network including a base transceiver station, a mobile switching center, and a service control point, the method comprising the steps of:

receiving a data collection request relating to use of the telecommunications device;

setting an origination trigger in the mobile switching center for the wireless telecommunications device;

receiving at the mobile switching center a communication from the telecommunications device;

launching a query from the mobile switching center to the service control point in accordance with the origination trigger;

sending a data collection query from the service control point to the mobile switching center in accordance with the data collection request;

sending data relating to use of the telecommunications device from the mobile switching center in response to the data collection query;

collecting the data relating to the use of the telecommunications device; and reporting the data to an authorized user of the network.

2. The method as set forth in claim 1, wherein the data collection request is sent to the service control point from a subscriber of the network via the internet.

3. The method as set forth in claim 1, wherein the data collection request is sent to a web interface coupled with the service control point from a subscriber of the network via the internet.

4. The method as set forth in claim 1, wherein the data is collected in a data collection device coupled with the service control point.

5. The method as set forth in claim 4, wherein the data is reported to the authorized user with a data reporting device coupled with the data collection device.

6. The method as set forth in claim 5, wherein the data collection device and the data reporting device communicate via TCP/IP protocols.

7. The method as set forth in claim 1, wherein the data collection request includes a request for information selected from the group consisting of:

location of the telecommunications device;

number of calls made by the telecommunications device;

number of calls received by the telecommunications device;

duration of calls made by the telecommunications device;

duration of calls made to the telecommunications device;

terminating phone numbers for calls made by the telecommunications device;

originating phone numbers for calls received by the telecommunications device;

how long the telecommunications device has been in a particular location; and when the telecommunications device last made or received a call.

* * * * *